(12) United States Patent
Hay et al.

(10) Patent No.: US 12,122,382 B2
(45) Date of Patent: Oct. 22, 2024

(54) SYSTEMS AND METHODS FOR IMPLEMENTING A LANE CHANGE IN RESPONSE TO A CLOSED LANE SEGMENT

(71) Applicant: GM Global Technology Operations LLC, Detroit, MI (US)

(72) Inventors: Curtis L. Hay, Washington Township, MI (US); Donald K. Grimm, Utica, MI (US); Chuan Li, Troy, MI (US); David Allen Craig, Owasso, OK (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 331 days.

(21) Appl. No.: 17/729,387

(22) Filed: Apr. 26, 2022

(65) Prior Publication Data
US 2023/0339470 A1 Oct. 26, 2023

(51) Int. Cl.
| | | |
|---|---|---|
| *B60W 30/18* | (2012.01) | |
| *B60W 30/095* | (2012.01) | |
| *B60W 30/16* | (2020.01) | |
| *B60W 40/06* | (2012.01) | |
| *B60W 50/14* | (2020.01) | |
| *B60W 60/00* | (2020.01) | |
| *B60W 50/00* | (2006.01) | |

(52) U.S. Cl.
CPC .. *B60W 30/18163* (2013.01); *B60W 30/0956* (2013.01); *B60W 30/16* (2013.01); *B60W 40/06* (2013.01); *B60W 50/14* (2013.01); *B60W 60/0015* (2020.02); *B60W 60/0053* (2020.02); *B60W 2050/0083* (2013.01); *B60W 2050/146* (2013.01); *B60W 2554/80* (2020.02); *B60W 2556/10* (2020.02); *B60W 2556/50* (2020.02)

(58) Field of Classification Search
CPC ....... B60W 30/18163; B60W 30/0956; B60W 30/10; B60W 40/06; B60W 60/015; B60W 50/14; B60W 60/0053; B60W 2050/0083; B60W 2050/146; B60W 2554/80; B60W 2556/10; B60W 2556/50; B60W 2556/05; B60W 2556/45; B60W 60/001
USPC .......................................................... 701/41
See application file for complete search history.

(56) References Cited

U.S. PATENT DOCUMENTS

| | | | | |
|---|---|---|---|---|
| 2021/0086779 | A1* | 3/2021 | Benisch | B60W 40/09 |
| 2021/0197824 | A1* | 7/2021 | Kim | G06V 20/584 |
| 2022/0371615 | A1* | 11/2022 | Nishiwaki | G08G 1/161 |
| 2023/0286509 | A1* | 9/2023 | Kume | B60W 60/0051 |

\* cited by examiner

*Primary Examiner* — Yi-Kai Wang
(74) *Attorney, Agent, or Firm* — Vivacqua Crane, PLLC (57) ABSTRACT

A first closed lane segment file including a first lane change histogram and a lane closure start point associated with a closed lane segment of a first lane of a road is received from a lane change data aggregation system at a lane change management system. The first lane change histogram includes a distribution of a plurality of lane change points received from vehicles that previously engaged in a lane change from the first lane to a second lane of the road in response to the closed lane segment. A lane change control point is determined based on the first lane change histogram at the lane change management system. A command is issued from the lane change management system to an ADS of the autonomous vehicle to initiate a lane change from the first lane to the second lane at the lane change control point.

20 Claims, 6 Drawing Sheets

SYSTEMS AND METHODS FOR IMPLEMENTING A LANE CHANGE IN RESPONSE TO A CLOSED LANE SEGMENT

INTRODUCTION

The technical field generally relates to autonomous vehicles, and more particularly relates to systems and methods for implementing a lane change of an autonomous vehicle in response to a closed lane segment.

Dynamic changes in road conditions can result in the closure of lane segments of lanes on roads. Examples of such dynamic changes include, but are not limited to, road construction and accidents. High-definition maps used for autonomous vehicle localization typically cannot be updated in real-time to accurately represent lane segments that have been closed in response to a dynamic change in road conditions and may create potential operational challenges for autonomous vehicles.

An unexpected lane segment closure may impact the ability of an autonomous vehicle to safely implement a lane change from a first lane of a road including the closed lane segment to a second lane of the road. A lane change management system configured to receive up-to-date lane segment closures and associated lane change information may enable an autonomous vehicle to safely implement lane change related maneuvers.

SUMMARY

In an embodiment, a lane change management system for implementing a lane change of an autonomous vehicle in response to a closed lane segment includes a processor and a memory. The memory includes instructions that upon execution by the processor, cause the processor to: receive a first closed lane segment file including a first lane change histogram and a lane closure start point associated with a closed lane segment of a first lane of a road from a lane change data aggregation system, the first lane change histogram comprising a distribution of a plurality of lane change points received from vehicles that previously engaged in a lane change from the first lane to a second lane of the road in response to the closed lane segment; determine a lane change control point based on the first lane change histogram; and issue a command to an ADS of the autonomous vehicle to initiate a lane change from the first lane to the second lane at the lane change control point.

In an embodiment, the memory further includes instructions that upon execution by the processor, cause the processor to identify the lane change control point as a mean lane change point of the distribution of the plurality of lane change points in the first lane change histogram.

In an embodiment, the memory further includes instructions that upon execution by the processor, cause the processor to identify the lane change control point as a median lane change point of the distribution of the plurality of lane change points in the first lane change histogram.

In an embodiment, the memory further includes instructions that upon execution by the processor, cause the processor to: receive a plurality of closed lane segment files associated with a plurality of closed lane segments from the lane change data aggregation system, each of the plurality of closed lane segment files including at least one lane change histogram and a lane closure start point; store the plurality of closed lane segment files at a local closed lane segment database; receive a vehicle location of the autonomous vehicle from a vehicle sensor system; determine whether the first lane closure start point associated with one of the plurality of closed lane segments is within a pre-defined distance of the vehicle location; and retrieve the first closed lane segment file based on the determination.

In an embodiment, the memory further includes instructions that upon execution by the processor, cause the processor to: receive the first closed lane segment file including a plurality of lane change histograms associated with the closed lane segment from the lane change data aggregation system, each of the plurality of lane change histograms being associated with a different pre-defined time interval; and identify the first lane change histogram from the plurality of lane change histograms, the first lane change histogram being associated with a first pre-defined time interval including a current time.

In an embodiment, the memory further includes instructions that upon execution by the processor, cause the processor to: define a virtual road segment of the first lane extending from the lane closure start point to a virtual lane segment end point, the virtual lane segment end point being disposed at a pre-defined distance ahead of the lane closure start point; generate a lane change inform point at a pre-defined preview distance ahead of the virtual lane segment; and issue a command to a user interface of the autonomous vehicle to display a lane change indication at the lane change inform point.

In an embodiment, the memory further includes instructions that upon execution by the processor, cause the processor to: determine a lane change alert point on the first lane based on a time to collision associated with the lane closure start point; determine whether the lane change from the first lane to the second lane has been initiated prior to arrival of the autonomous vehicle at the lane change alert point; and issue a command to a user interface of the autonomous vehicle to display a lane change takeover request based on the determination.

In an embodiment, the memory further includes instructions that upon execution by the processor, cause the processor to: receive a user preference defining a gap setting between the autonomous vehicle and a vehicle disposed in front of the autonomous vehicle; and adjust the lane change control point in accordance with the user preference.

In an embodiment, the memory further includes instructions that upon execution by the processor, cause the processor to: detect whether the autonomous vehicle has completed the lane change from the first lane to the second lane; and issue a command to a user interface of the autonomous vehicle to display a lane change complete indication based upon the determination.

In an embodiment, a computer readable medium includes instructions stored thereon for implementing a lane change of an autonomous vehicle in response to a closed lane segment, that upon execution by a processor, cause the processor to: receive a first closed lane segment file including a first lane change histogram and a lane closure start point associated with a closed lane segment of a first lane of a road from a lane change data aggregation system, the first lane change histogram comprising a distribution of a plurality of lane change points received from vehicles that previously engaged in a lane change from the first lane to a second lane of the road in response to the closed lane segment; determine a lane change control point based on the first lane change histogram; and issue a command to an ADS of the autonomous vehicle to initiate a lane change from the first lane to the second lane at the lane change control point.

In an embodiment, the computer readable medium further includes instructions to cause the processor to identify the lane change control point as a mean lane change point of the distribution of the plurality of lane change points in the first lane change histogram.

In an embodiment, the computer readable medium further includes instructions to cause the processor to identify the lane change control point as a median lane change point of the distribution of the plurality of lane change points in the first lane change histogram.

In an embodiment, the computer readable medium further includes instructions to cause the processor to: receive a plurality of closed lane segment files associated with a plurality of closed lane segments from the lane change data aggregation system, each of the plurality of closed lane segment files including at least one lane change histogram and a lane closure start point; store the plurality of closed lane segment files at a local closed lane segment database; receive a vehicle location of the autonomous vehicle from a vehicle sensor system; determine whether the first lane closure start point associated with one of the plurality of closed lane segments is within a pre-defined distance of the vehicle location; and retrieve the first closed lane segment file based on the determination.

In an embodiment, the computer readable medium further includes instructions to cause the processor to: receive the first closed lane segment file including a plurality of lane change histograms associated with the closed lane segment from the lane change data aggregation system, each of the plurality of lane change histograms being associated with a different pre-defined time interval; and identify the first lane change histogram from the plurality of lane change histograms, the first lane change histogram being associated with a first pre-defined time interval including a current time.

In an embodiment, the computer readable medium further includes instructions to cause the processor to: define a virtual road segment of the first lane extending from the lane closure start point to a virtual lane segment end point, the virtual lane segment end point being disposed at a pre-defined distance ahead of the lane closure start point; generate a lane change inform point at a pre-defined preview distance ahead of the virtual lane segment; and issue a command to a user interface of the autonomous vehicle to display a lane change indication at the lane change inform point.

In an embodiment, the computer readable medium further includes instructions to cause the processor to: determine a lane change alert point on the first lane based on a time to collision associated with the lane closure start point; determine whether the lane change from the first lane to the second lane has been initiated prior to arrival of the autonomous vehicle at the lane change alert point; and issue a command to a user interface of the autonomous vehicle to display a lane change takeover request based on the determination.

In an embodiment, a method of implementing a lane change of an autonomous vehicle in response to a closed lane segment includes: receiving a first closed lane segment file including a first lane change histogram and a lane closure start point associated with a closed lane segment of a first lane of a road from a lane change data aggregation system at a lane change management system, the first lane change histogram comprising a distribution of a plurality of lane change points received from vehicles that previously engaged in a lane change from the first lane to a second lane of the road in response to the closed lane segment; determining a lane change control point based on the first lane change histogram at the lane change management system; and issuing a command from the lane change management system to an ADS of the autonomous vehicle to initiate a lane change from the first lane to the second lane at the lane change control point.

In an embodiment, the method further includes: receiving the first closed lane segment file including a plurality of lane change histograms associated with the closed lane segment from the lane change data aggregation system at the lane change management system, each of the plurality of lane change histograms being associated with a different pre-defined time interval; and identifying the first lane change histogram from the plurality of lane change histograms, the first lane change histogram being associated with a first pre-defined time interval including a current time at the lane change management system.

In an embodiment, the method further includes: defining a virtual road segment of the first lane extending from the lane closure start point to a virtual lane segment end point at the lane change management system, the virtual lane segment end point being disposed at a pre-defined distance ahead of the lane closure start point; generating a lane change inform point at a pre-defined preview distance ahead of the virtual lane segment at the lane change management system; and issuing a command from the lane change management system to a user interface of the autonomous vehicle to display a lane change indication at the lane change inform point.

In an embodiment, the method further includes: determining a lane change alert point on the first lane based on a time to collision associated with the lane closure start point at the lane change management system; determining whether the lane change from the first lane to the second lane has been initiated prior to arrival of the autonomous vehicle at the lane change alert point at the lane change management system; and issuing a command from the lane change management system to a user interface of the autonomous vehicle to display a lane change takeover request based on the determination.

BRIEF DESCRIPTION OF THE DRAWINGS

Exemplary embodiments will hereinafter be described in conjunction with the following drawing figures, wherein like numerals denote like elements.

DETAILED DESCRIPTION

The following detailed description is merely exemplary in nature and is not intended to limit the application and uses.

Furthermore, there is no intention to be bound by any expressed or implied theory presented in the preceding introduction, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
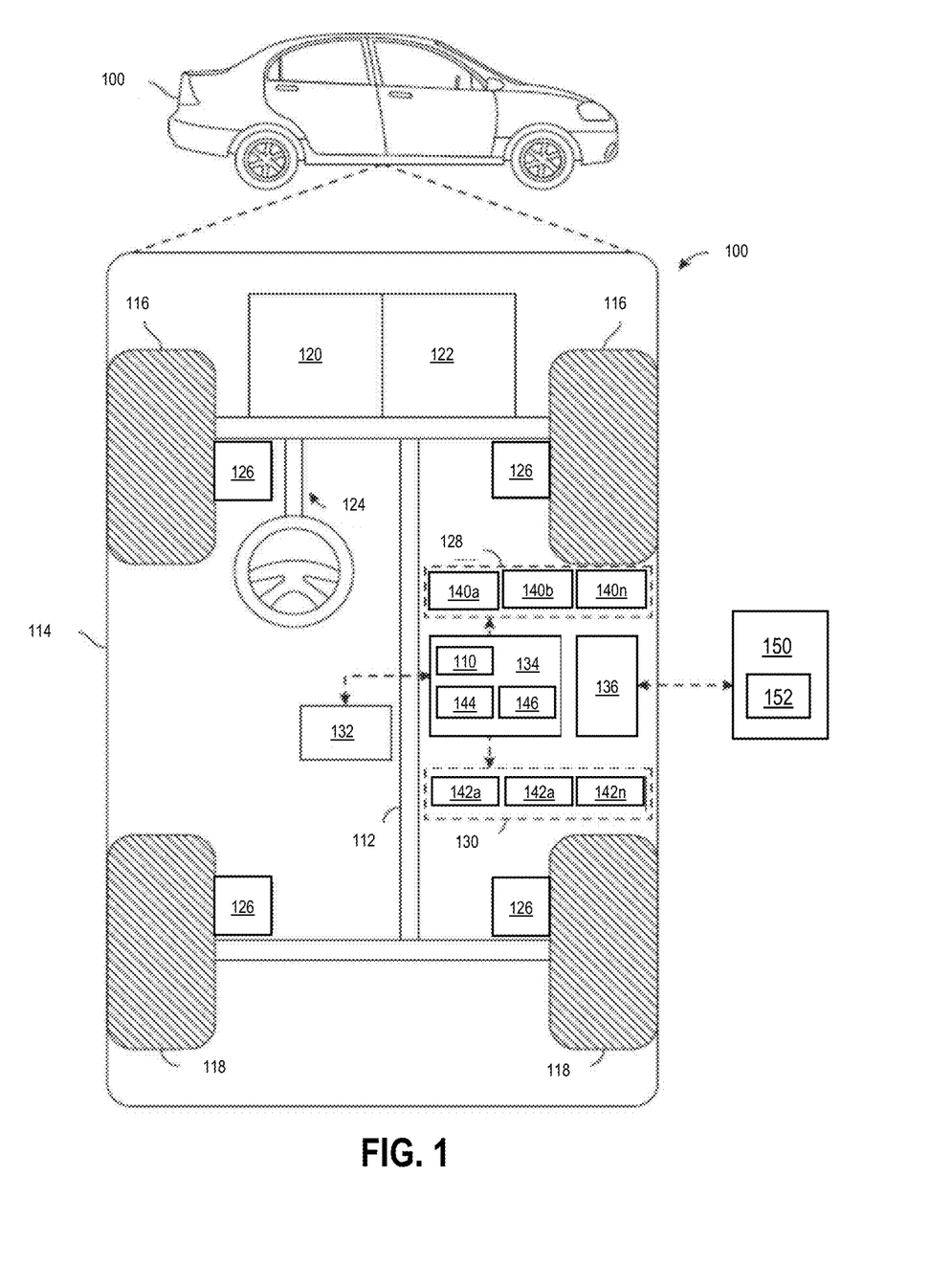
FIG. 1 is a functional block diagram representation of an autonomous vehicle including an embodiment of a lane change management system.

Referring to FIG. 1 a functional block diagram representation of an autonomous vehicle 100 including an embodiment of a lane change management system 110 is shown. The autonomous vehicle 100 is configured to be communicatively coupled to an edge computing system 150. The edge computing system 150 is configured to host an embodiment of a lane change data aggregation system 152.

The autonomous vehicle 100 generally includes a chassis 112, a body 114, front wheels 116, and rear wheels 118. The body 114 is arranged on the chassis 112 and substantially encloses components of the autonomous vehicle 100. The body 114 and the chassis 112 may jointly form a frame. The front wheels 116 and the rear wheels 118 are each rotationally coupled to the chassis 112 near a respective corner of the body 114.

The autonomous vehicle 100 is, for example, a vehicle that is automatically controlled to carry passengers from one location to another. While the autonomous vehicle 100 is depicted in the illustrated embodiment as a passenger car, other examples of autonomous vehicles include, but are not limited to, motorcycles, trucks, sport utility vehicles (SUVs), recreational vehicles (RVs), marine vessels, and aircraft.

In an embodiment, the vehicle may be a so-called a Level One, a Level Two, a Level Three, Level Four, or Level Five automation system. A Level Five system indicates "full automation," referring to the full-time performance by an ADS of all aspects of the dynamic driving task under all roadway and environmental conditions that can be managed by a human driver. A Level Four system indicates "high automation", referring to the driving mode-specific performance by an automated driving system (ADS) of all aspects of the dynamic driving task, even if a human driver does not respond appropriately to a request to intervene. In Level Three vehicles, the vehicle systems perform the entire dynamic driving task (DDT) within the area that it is designed to do so. The vehicle operator is only expected to be responsible for the DDT-fallback when the trailing vehicle 100 essentially "asks" the driver to take over if something goes wrong or the vehicle is about to leave the zone where it is able to operate. In Level Two vehicles, systems provide steering, brake/acceleration support, lane centering, and adaptive cruise control. In Level One vehicles, the driver employs full control over vehicle operations.

As shown, the autonomous vehicle 100 generally includes a propulsion system 120, a transmission system 122, a steering system 124, a brake system 126, a vehicle sensor system 128, an actuator system 130, at least one data storage device 132, at least one controller 134, and a vehicle communication system 136. The propulsion system 120 may, in various embodiments, include an internal combustion engine, an electric machine such as a traction motor, and/or a fuel cell propulsion system. The transmission system 122 is configured to transmit power from the propulsion system 120 to the front wheels 116 and the rear wheels 118 according to selectable speed ratios. According to various embodiments, the transmission system 122 may include a step-ratio automatic transmission, a continuously-variable transmission, or other appropriate transmission. The brake system 126 is configured to provide braking torque to the front wheels 116 and the rear wheels 118. The brake system 126 may, in various embodiments, include friction brakes, brake by wire, a regenerative braking system such as an electric machine, and/or other appropriate braking systems. The steering system 124 influences a position of the front wheels 116 and the rear wheels 118. While depicted as including a steering wheel for illustrative purposes, in some embodiments contemplated within the scope of the present disclosure, the steering system 124 may not include a steering wheel.

The vehicle sensor system 128 includes one or more vehicle sensing devices 140a-140n that sense observable conditions of the exterior environment and/or the interior environment of the autonomous vehicle 100. Examples of vehicle sensing devices 140a-140n include, but are not limited to, radars, lidars, global positioning systems, optical cameras, thermal cameras, ultrasonic sensors, and/or other sensors. The actuator system 130 includes one or more actuator devices 142a-142n that control one or more vehicle features such as for example, but not limited to, the propulsion system 120, the transmission system 122, the steering system 124, and the brake system 126. In various embodiments, the vehicle features can further include interior and/or exterior vehicle features such as for example, but are not limited to, doors, a trunk, and cabin features such as for example air, music, and lighting.

The vehicle communication system 136 is configured to wirelessly communicate information to and from other entities 148 ("vehicle-to-everything (V2X) communication), such as for example, but not limited to, other vehicles ("V2V" communication,) infrastructure ("vehicle-to-infrastructure (V2I)" communication), remote systems, and/or personal devices. In an embodiment, the vehicle communication system 136 is configured to communicate information to and receive information from the edge computing system 150 including an embodiment of the lane change histogram system 152. The vehicle communication system 136 is configured to communicate information to and receive information from a cloud system including an embodiment of the lane change histogram system 152.

In an embodiment, the vehicle communication system 136 is a wireless communication system configured to communicate via a wireless local area network (WLAN) using IEEE 802.11 standards or by using cellular data communication. However, additional or alternate communication methods, such as a dedicated short-range communications (DSRC) or Cellular V2X (C-V2X) channel, are also considered within the scope of the present disclosure. DSRC or C-V2X channels refer to one-way or two-way short-range to medium-range wireless communication channels designed for automotive use and a corresponding set of protocols and standards.

The data storage device 132 stores data for use in automatically controlling the autonomous vehicle 100. The data storage device 132 may be part of the controller 134, separate from the controller 134, or part of the controller 134 and part of a separate system.

The controller 134 includes at least one processor 144 and a computer readable storage device 146. The computer readable storage device 146 may also be referred to a computer readable media 146 and a computer readable medium 146. In an embodiment, the computer readable storage device 146 includes an embodiment of the lane change management system 110. The processor 144 can be any custom made or commercially available processor, a central processing unit (CPU), a graphics processing unit (GPU), an auxiliary processor among several processors associated with the controller 134, a semiconductor-' based microprocessor (in the form of a microchip or chip set), a macroprocessor, any combination thereof, or generally any device for executing instructions. The computer readable storage device 146 may include volatile and nonvolatile storage in read-only memory (ROM), random-access memory (RAM), and keep-alive memory (KAM), for example. KAM is a persistent or non-volatile memory that may be used to store various operating variables while the processor 144 is powered down. The computer-readable storage device 146 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 134 in controlling the autonomous vehicle 100.

The instructions may include one or more separate programs, each of which comprises an ordered listing of executable instructions for implementing logical functions. The instructions, when executed by the processor 144, receive and process signals from the vehicle sensor system 128, perform logic, calculations, methods and/or algorithms for automatically controlling the components of the autonomous vehicle 100, and generate control signals to the actuator system 130 to automatically control one or more components of the autonomous vehicle 100 based on the logic, calculations, methods, and/or algorithms. Although only one controller 134 is shown in FIG. 1, alternative embodiments of the autonomous vehicle 100 can include any number of controllers 134 that communicate over any suitable communication medium or a combination of communication mediums and that cooperate to process the sensor signals, perform logic, calculations, methods, and/or algorithms, and generate control signals to automatically control features of the autonomous vehicle 100.

In various embodiments, one or more instructions of the controller 134 are embodied to provide ADS functions as described with reference to one or more of the embodiments herein. The controller 134 or one of its functional modules is configured to implement the functions as described with reference to embodiments of the lane change management system 110.

Figure 2:
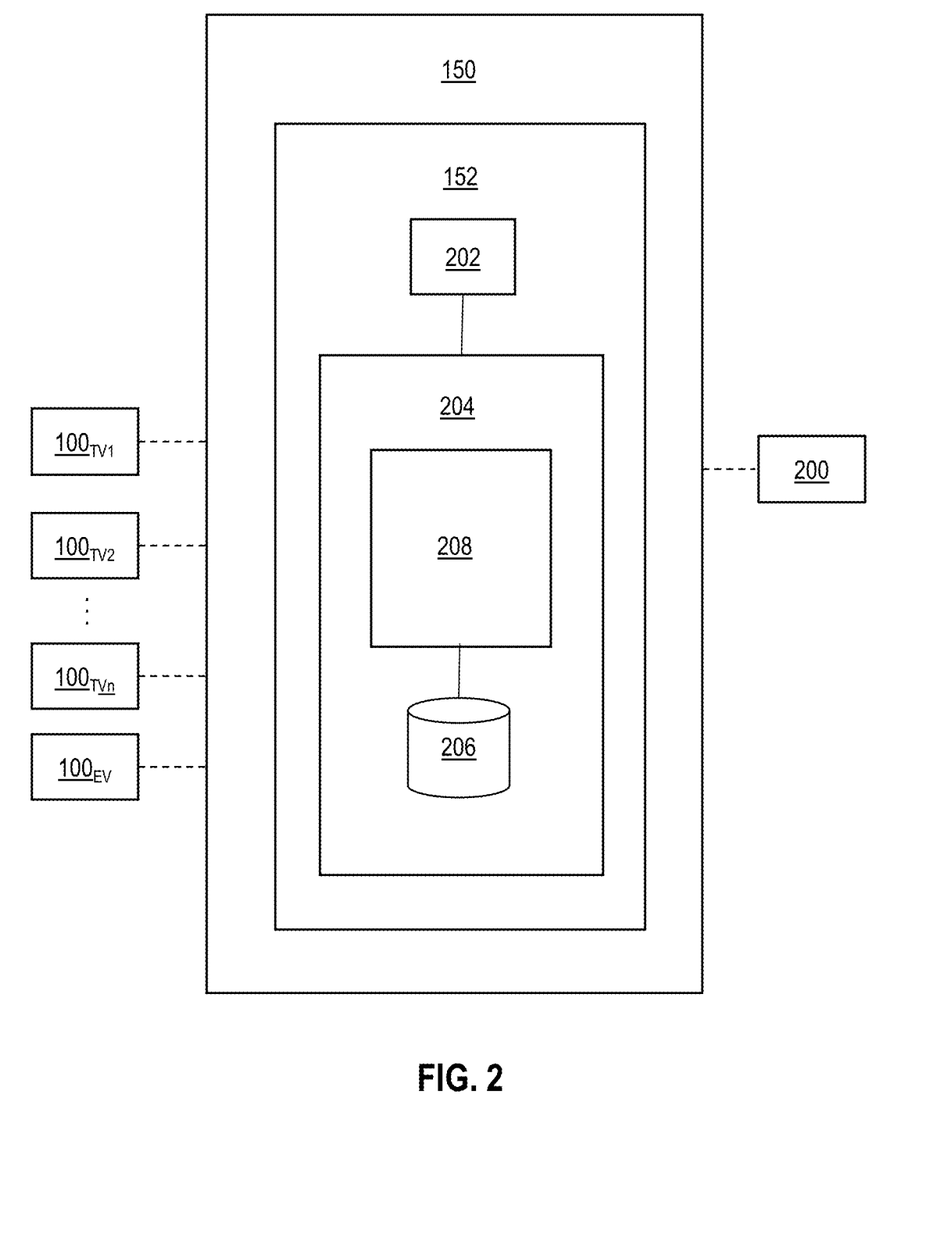
FIG. 2 is a functional block diagram representation of an edge computing system including an embodiment of a lane change data aggregation system.

Referring to FIG. 2, a functional block diagram representation of an edge computing system 150 including an embodiment of a lane change data aggregation system 152 is shown. In an alternative embodiment, a cloud system is configured to host an embodiment of a lane change data aggregation system 152. The cloud system has a configuration similar to the configuration of the edge computing system 150 described below and performs functions that are similar to the functions of the edge computing system 150 described below.

The edge computing system 150 is configured to be communicatively coupled to an infrastructure owner operator (IOO) system 200. The IOO system 200 is configured to maintain road condition data about dynamic conditions that may occur on roads. Examples of dynamic conditions include, but are not limited to, road construction and accidents. An example of road condition data is a closed lane segment of a lane on a road in response to a dynamic condition. The road condition data includes, for example, a lane closure start point and a lane closure end point.

In an embodiment, the IOO system 200 is a Work Zone Data Exchange (WZDx) system. The IOO system 200 is configured to receive work zone data from infrastructure owners and operators (IOOs) and make harmonized work zone data available for third party use. An example of work zone data is road condition data associated with a road undergoing road construction. The IOO system 200 may be configured to receive smart work zone device data as well as non-work zone road restrictions. The IOO system 200 may enable road owners to share nuanced work zone data about worker presence in work zones. The IOO system 200 may make travel on public roads safer and more efficient through ubiquitous access to road condition data associated with work zone activity.

The IOO system 200 is configured to provide road condition data, such as for example a lane closure start point and a lane closure end point associated with a closed lane segment of a lane on a road to the edge computing system 150. In an embodiment, the IOO system 200 is configured to periodically push the road condition data to the edge computing system 150. The road condition data is provided to the lane change data aggregation system 152 at the edge computing system 150 for processing.

The edge computing system 150 is configured to be communicatively coupled to a plurality of traffic vehicles $100_{TV1}$, $100_{TV2}$, $100_{TVN}$ and an ego autonomous vehicle $100_{EV}$. In an embodiment, one or more of the traffic vehicles $100_{TV1}$, $100_{TV2}$, $100_{TVN}$ has a configuration similar to the autonomous vehicle 100 described in FIG. 1. In an embodiment, one or more of the traffic vehicles $100_{TV1}$, $100_{TV2}$, $100_{TVN}$ is a manually driven vehicle. In an embodiment, the ego autonomous vehicle $100_{EV}$ has a configuration similar to the autonomous vehicle 100 described in FIG. 1. One or more of the plurality of traffic vehicles $100_{TV1}$, $100_{TV2}$, $100_{TV1}$ may be configured to operate as an ego autonomous vehicle $100_{EV}$. The ego autonomous vehicle $100_{EV}$ is configured to operate as a traffic autonomous vehicle $100_{TV1}$, $100_{TV2}$, $100_{TVN}$. One or more of the plurality of traffic vehicles $100_{TV1}$, $100_{TV2}$, $100_{TV1}$ and the ego autonomous vehicle $100_{EV}$ include a lane change management system 110.

Each of the plurality of traffic vehicles $100_{TV1}$, $100_{TV2}$, $100_{TVN}$ and the ego autonomous vehicle $100_{EV}$ are configured to be communicatively coupled to the edge computing system 150. When a traffic autonomous vehicle $100_{TV1}$, $100_{TV2}$, $100_{TVN}$ engages in a lane change from a first lane of a road to a second lane of the road in response to a closed lane segment on the first lane on a road, the traffic autonomous vehicle $100_{TV1}$, $100_{TV2}$, $100_{TVN}$ is configured to transmit vehicle data associated with the lane change to the edge computing system 150. The vehicle data received at the edge computing system 150 from the plurality of traffic vehicles $100_{TV1}$, $100_{TV2}$, $100_{TVN}$ is referred to as crowdsourced vehicle data.

In an embodiment, the vehicle data is the lane change point on the first lane where the traffic autonomous vehicle $100_{TV1}$, $100_{TV2}$, $100_{TVN}$ initiates the lane change from the first lane to the second lane in response to a closed lane segment on the first lane. The crowdsourced vehicle data transmitted by the plurality of traffic vehicles $100_{TV1}$, $100_{TV2}$, $100_{TVN}$ is received at the lane change data aggregation system 152 at the edge computing system 150 for processing. In an embodiment, the crowdsourced vehicle data is transmitted by a telematics system at each the plurality of traffic vehicles $100_{TV1}$, $100_{TV2}$, $100_{TVN}$ to the lane change data aggregation system 152 at the edge computing system 150. The crowdsourced vehicle data is the crowdsourced lane change point received from each of the plurality of traffic vehicles $100_{TV1}$, $100_{TV2}$, $100_{TVN}$.

The lane change data aggregation system 152 includes at least one processor 202, a memory 204, and a closed lane segment database 206. The memory 204 includes a closed lane segment file manager 208. In an embodiment, the lane change data aggregation system 152 is configured to periodically receive road data associated with closed lane segments on different lanes of different roads from the IOO system 200. The lane change data aggregation system 152 is configured to receive crowdsourced vehicle data associated with each of the closed lane segments from different traffic vehicles $100_{TV1}$, $100_{TV2}$, $100_{TVN}$ as the traffic autonomous vehicle $100_{TV1}$, $100_{TV2}$, $100_{TV1}$ changes lanes in response to a closed lane segment. In an embodiment, lane change data aggregation system 152 is configured to receive lane change point associated with each of the closed lane segment from the traffic vehicles $100_{TV1}$, $100_{TV2}$, $100_{TVN}$.

The closed lane segment file manager 208 is configured to generate a closed lane segment file for each of the closed lane segments. The closed lane segment file manager 208 is configured to generate a plurality of lane change histograms for each of the closed lane segments. The closed lane segment file manager 208 is configured to update the plurality of lane change histograms for each of the closed lane segments in accordance with road data received from the IOO 200 and/or crowdsourced vehicle data associated with each of the closed lane segments received from traffic vehicles $100_{TV1}$, $100_{TV2}$, $100_{TVN}$. Each of the closed lane segment files associated with a closed lane segment includes a lane closure start point and a lane closure end point associated with the closed lane segment. The closed lane segment file manager 208 is configured to store the closed lane segment files in the closed lane segment database 206.

Each of the plurality of lane change histograms for a closed lane segment is associated with a different pre-defined time interval based on the crowdsourced lane change points received from the traffic vehicles $100_{TV1}$, $100_{TV2}$, $100_{TVN}$ that engaged in a lane change in response to the closed lane segment during the pre-defined time interval. The lane change histogram represents a distribution of the number of traffic autonomous vehicle $100_{TV1}$, $100_{TV2}$, $100_{TVN}$ that engaged in a lane change at different lane change points in response to the closed lane segment during a pre-defined time interval. For example, a first lane change histogram associated with a closed lane segment may represent a pre-defined time interval extending from 7 AM to 9 AM on weekdays during rush hour and a second lane change histogram associated with the closed lane segment may represent a pre-defined time interval extending from 7 AM to 9 AM on a Saturday.

The lane change data aggregation system 152 is configured to transmit closed lane segment files to the ego autonomous vehicle $100_{EV}$. In an embodiment, the lane change data aggregation system 152 is configured to transmit closed lane segment files associated with closed lane segments within a predefined vicinity of a location of the ego autonomous vehicle $100_{EV}$ to the ego autonomous vehicle $100_{EV}$. In an embodiment, the lane change data aggregation system 152 is configured to transmit closed lane segment files associated with closed lane segments on a route that the ego autonomous vehicle $100_{EV}$ is expected to take to the ego autonomous vehicle $100_{EV}$.

While a number of different components of the edge computing system 150 have been described, the edge computing system 150 may include additional components that facilitate operation of the edge computing system 150. While one configuration of the edge computing system 150 has been described, alternative embodiments of the edge computing system 150 may have different configurations. While a number of different components of the lane change data aggregation system 152 have been described, the lane change data aggregation system 152 may include additional components that facilitate operation of the lane change data aggregation system 152. While one configuration of the lane change data aggregation system 152 has been described, alternative embodiments of the lane change data aggregation system 152 may have different configurations.

Figure 3:
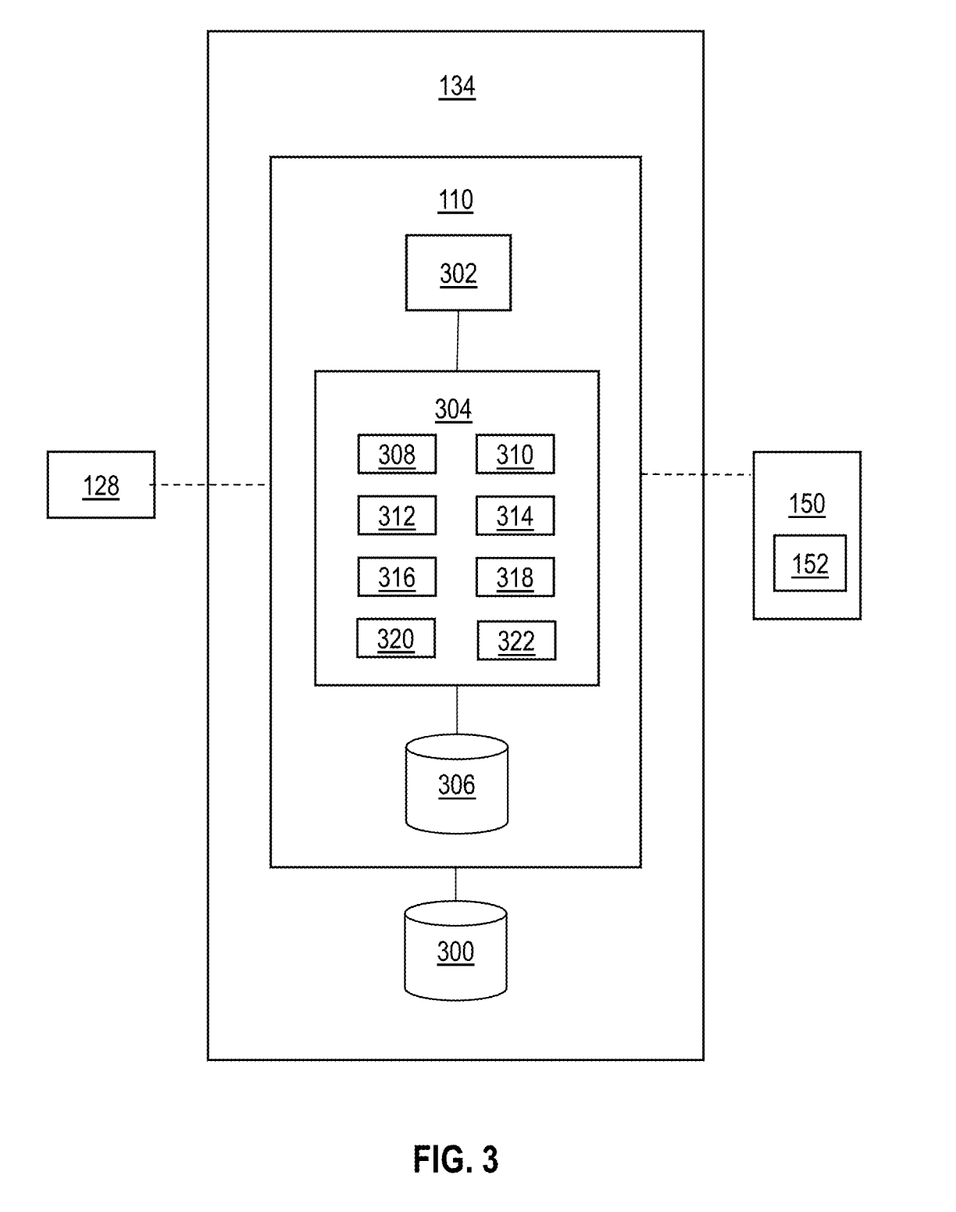
FIG. 3 is a functional block diagram representation of a controller of an autonomous vehicle including an embodiment of a lane change management system.

Referring to FIG. 3, a functional block diagram representation of a controller 134 of an autonomous vehicle 100 including an embodiment of a lane change management system 110 is shown. The controller 134 may include additional components that facilitate operation of the autonomous vehicle 100. The ego autonomous vehicle $100_{EV}$ includes an embodiment of the lane change management system 110. In an embodiment, one or more of the traffic vehicles $100_{TV1}$, $100_{TV2}$, $100_{TVN}$ include an embodiment of the lane change management system 110. The lane change management system 110 is configured to be communicatively coupled to the edge computing system 150 including an embodiment of a lane change data aggregation system 152. The lane change management system 110 is configured to be communicatively coupled to the vehicle sensor system 128. The lane change management system 110 is configured to be communicatively coupled to a map database 300. The map database 300 includes digital maps including road data.

In an embodiment, the lane change management system 110 includes a processor 302, a memory 304, and a local closed lane segment database 306. The memory 304 includes a vehicle location module 308, a file retrieval module 310, a histogram selection module 312, a virtual lane segment module 314, an inform point module 316, a control point module 318, an alert point module 320, and a lane change complete module 322. The lane change management system 110 may include additional components that facilitate operation of the lane change management system 110.

The lane change management system 110 is configured to receive a plurality of closed lane segment files is associated with closed lane segments from the lane change data aggregation system 152 at edge computing system 150. Each closed lane segment file includes a lane closure start point, a lane closure end point, and a set of lane change histograms associated with the closed lane segment. In an embodiment, the lane change management system 110 is configured to receive the plurality of closed lane segment files from the lane change data aggregation system 152 via a telematics system of the ego autonomous vehicle $100_{EV}$. The lane change management system 110 is configured to store the received closed lane segment files in the local closed lane segment database 306.

Each of the lane change histograms in the set of lane changes histograms for a closed lane segment is associated with a different pre-defined time interval based on the crowdsourced lane change points received from the traffic vehicles $100_{TV1}$, $100_{TV2}$, $100_{TVN}$ that engaged in a lane change in response to the closed lane segment during the pre-defined time interval. Each lane change histogram represents a distribution of the number of traffic autonomous vehicle $100_{TV1}$, $100_{TV2}$, $100_{TVN}$ that engaged in a lane change at different lane change points in response to the closed lane segment. For example, a first lane change histogram associated with a closed lane segment may represent a pre-defined time interval extending from 7 AM to 9 AM on weekdays during rush hour and a second lane change histogram associated with the closed lane segment may represent a pre-defined time interval extending from 7 AM to 9 AM on a Saturday.

In an embodiment, the lane change management system 110 is configured to receive a plurality of closed lane segment files associated with closed lane segments within a predefined vicinity of a location of the ego autonomous vehicle $100_{EV}$. In an embodiment, the lane change management system 110 is configured to receive a plurality of closed lane segment files associated with closed lane segments on a route that the ego autonomous vehicle $100_{EV}$ is expected to take during a trip.

Figure 4:
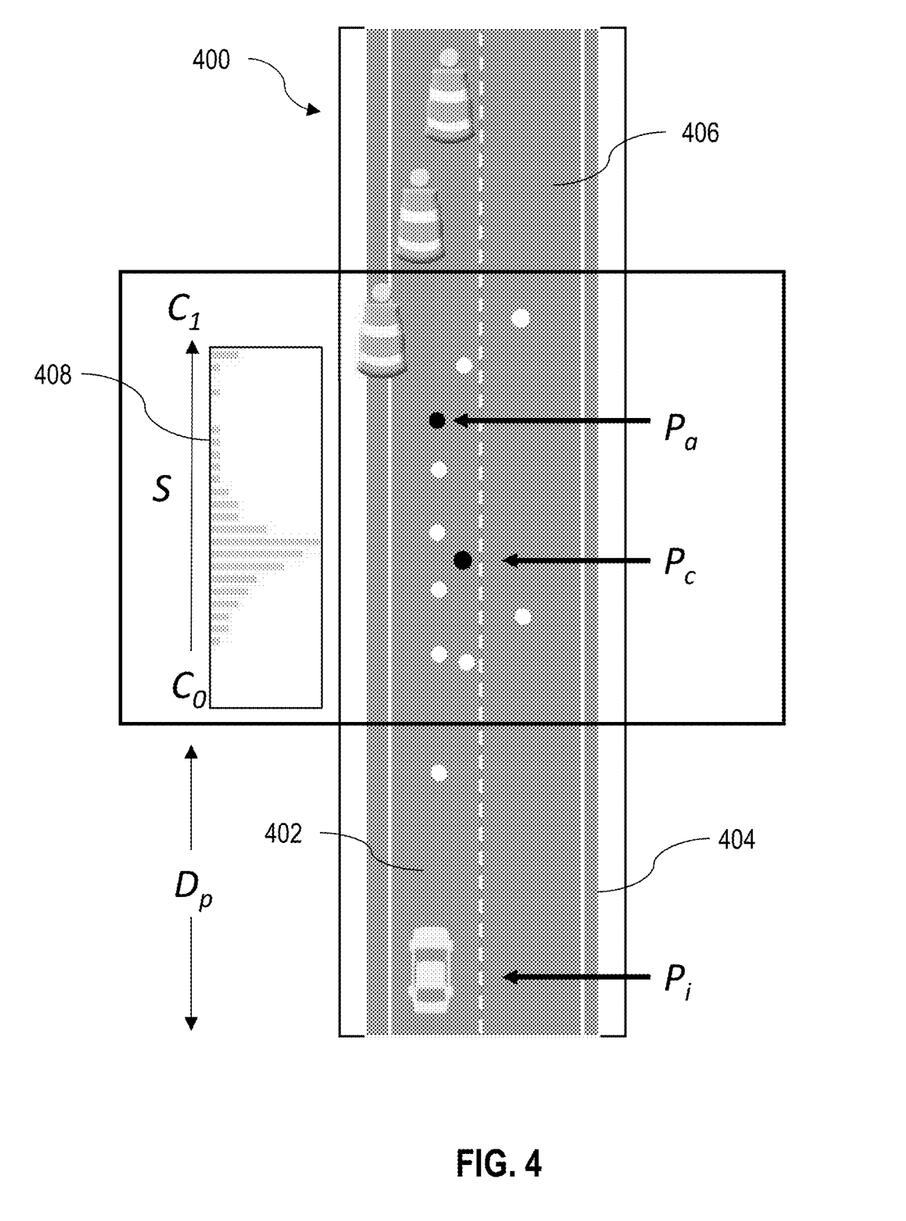
FIG. 4 is a diagrammatic representation of an example of an ego autonomous vehicle including an embodiment of a lane change management system approaching a closed lane segment on a first lane of a road.

Referring to FIG. 4, a diagrammatic representation of an example of an ego autonomous vehicle $100_{EV}$ including an embodiment of a lane change management system 110 approaching a closed lane segment 400 on a first lane of a road 404 is shown. The road 404 includes the first lane 402 and a second lane 406. The vehicle location module 308 of the lane change management system 110 is configured to receive vehicle location data associated with the ego autonomous vehicle $100_{EV}$ from a global positioning system of a vehicle sensor system 128 of the ego autonomous vehicle $100_{EV}$. The vehicle location module 308 is configured to determine a vehicle location of the ego autonomous vehicle $100_{EV}$ based on the received vehicle location data in conjunction with the digital maps and road data stored in the map database 300. The vehicle location defines the location of the ego autonomous vehicle $100_{EV}$ on the first lane 402 of the road 404. The vehicle location module 308 is configured to generate a time stamp for association with the vehicle location of the ego autonomous vehicle $100_{EV}$. The time stamp is associated with a current time.

The file retrieval module 310 is configured to retrieve a closed lane segment file associated with an approaching closed lane segment 400 from the local closed lane segment database 306. The local closed lane segment database 306 of the lane management system 110 includes a plurality of closed lane segment files received from the lane change data aggregation system 152 at the edge computing system 150. Each of the plurality of closed lane segment files is associated with a closed lane segment 400 and includes a lane closure start point $C_1$, a lane closure end point, and a set of lane change histograms 408 associated with the closed lane segment 400. Each of the lane change histograms 408 in the set of lane changes histograms is associated with a different pre-defined time interval based on the crowdsourced lane change points received from the traffic vehicles $100_{TV1}$, $100_{TV2}$, $100_{TVN}$ that engaged in a lane change in response to the closed lane segment 400 during the pre-defined time interval. Each lane change histogram 408 represents a distribution of the number of traffic autonomous vehicle $100_{TV1}$, $100_{TV2}$, $100_{TVN}$ that engaged in a lane change at different lane change points in response to the closed lane segment 400 during a pre-defined time interval.

The file retrieval module 310 is configured to determine whether the local closed lane segment database 306 includes a closed lane segment file including a lane closure start point $C_1$ of a closed lane segment 400 within a pre-defined distance of the vehicle location of the ego autonomous vehicle $100_{EV}$. If the file retrieval module 310 determines the local closed lane segment database 306 includes a closed lane segment file including a lane closure start point $C_1$ of a closed lane segment 400 within a pre-defined distance of the vehicle location of the ego autonomous vehicle $100_{EV}$, the file retrieval module 310 is configured to retrieve the closed lane segment file.

The histogram selection module 312 is configured to select the lane change histogram 408 from the set of lane change histograms in the retrieved closed lane segment file associated with a pre-defined time interval that includes the time defined in the time stamp associated with the vehicle location the ego autonomous vehicle $100_{EV}$. The selected lane change histogram 408 is based on crowdsourced lane change points received from traffic vehicles $100_{TV1}$, $100_{TV2}$, $100_{TVN}$ that engaged in a lane change from the first lane 402 of the road 404 to the second lane 406 of the road 404 in response to the closed lane segment 400 during the pre-defined time interval including the time in the time stamp associated with the vehicle location. The lane change histogram 408 represents a distribution of the number of traffic autonomous vehicle $100_{TV1}$, $100_{TV2}$, $100_{TVN}$ that engaged in a lane change at different lane change points in response to the closed lane segment 400 during the pre-defined time interval.

The virtual lane segment module 314 is configured to define a virtual lane segment S associated with a closed lane segment 400. The virtual lane segment S begins at the lane closure start point $C_1$ in the retrieved closed lane segment file and ends at a virtual lane segment end point $C_0$. The virtual lane segment end point $C_0$ is at a pre-defined distance prior to the lane closure start point $C_1$.

The inform point module 316 is configured to generate a lane change inform point $P_i$ associated with a closed lane segment 400. The lane change inform point $P_i$ is at a preview distance $D_p$ ahead of the virtual lane segment S. The preview distance $D_p$ is a pre-defined distance. The inform point module 316 is configured to issue a command to a user interface of the ego autonomous vehicle $100_{EV}$ to display a lane change indication at the user interface at the lane change inform point $P_i$. The lane change indication operates to inform the occupants of the ego autonomous vehicle $100_{EV}$ that a lane change is expected to occur from the first lane 402 to the second lane 406 of the road 404 in response to the closed lane segment 400.

The control point module 318 is configured to determine a lane change control point $P_c$ based on the lane change histogram 408 selected by the histogram selection module 312. The lane change histogram 408 represents a distribution of the number of traffic autonomous vehicle $100_{TV1}$, $100_{TV2}$, $100_{TVN}$ that engaged in a lane change at different lane change points in response to the closed lane segment 400. In an embodiment, the control point module 318 is configured to identify a mean lane change point of the distribution of lane changes points in the lane change histogram 408 as the lane change control point $P_c$. In an embodiment, the control point module 310 is configured to identify a median lane change point of the distribution of lane changes points in the lane change histogram 408 as the lane change control point $P_c$.

The control point module 318 is configured to issue a command to a user interface of the ego autonomous vehicle $100_{EV}$ to display a lane change control point indication at the user interface. The lane change control point indication operates to inform the occupants of the ego autonomous vehicle $100_{EV}$ that a lane change has been initiated from the first lane 402 to the second lane 406 of the road 404 in response to the closed lane segment 400 at the lane change control point $P_c$.

In an embodiment, the control point module 318 is configured to receive a user preference provided by an occupant of the ego autonomous vehicle $100_{EV}$. The control point module 318 is configured to adjust the lane change control point $P_c$ in accordance with the user preference. In an embodiment, the user preference is a gap setting. In an embodiment, the user preference is a direct preference.

The ADS of the ego autonomous vehicle $100_{EV}$ is configured to receive the lane change control point $P_c$ from the control point module 318 and implement actions to initiate a lane change from the first lane 402 to the second lane 404 at the lane change control point $P_c$. Examples of actions implemented by the ADS include, but are not limited to, turn signal activation, adjacent vehicle sensing and motion control to execute the lane change.

The alert point module 320 is configured to determine a lane change alert point $P_a$ based on a time to collision (TTC) associated with the lane closure start point $C_1$ of the closed lane segment 400. The lane change alert point $P_a$ is disposed at a distance ahead of the lane closure start point $C_1$. If the ADS of the ego autonomous vehicle $100_{EV}$ is unable to initiate a lane change from the first lane 402 to the second lane 406 prior to the arrival of the ego autonomous vehicle $100_{EV}$ at the lane change alert point $P_a$, the alert point module 320 is configured to issue a command to a user interface of the ego autonomous vehicle $100_{EV}$ to display a lane change takeover request at the user interface at the lane change alert point $P_a$. The lane change takeover request is a request to a user of the ego autonomous vehicle $100_{EV}$ to assume manual control of the ego autonomous vehicle $100_{EV}$ to manually initiate the lane change from the first lane 402 to the second lane 404 in response to the closed lane segment 400.

The lane change complete module 322 is configured to detect when the ego autonomous vehicle $100_{EV}$ has completed the lane change from the first lane 402 to the second lane 406 and issue a command to a user interface of the ego autonomous vehicle $100_{EV}$ to display a lane change completion indication at the user interface. In an embodiment, when a user of the ego autonomous vehicle $100_{EV}$ manually implements the lane change from the first lane 402 to the second lane 404 in response to the closed lane segment 400, the lane change complete module 322 does not issue a command to a user interface of the ego autonomous vehicle $100_{EV}$ to display a lane change completion indication at the user interface.

Figure 5:
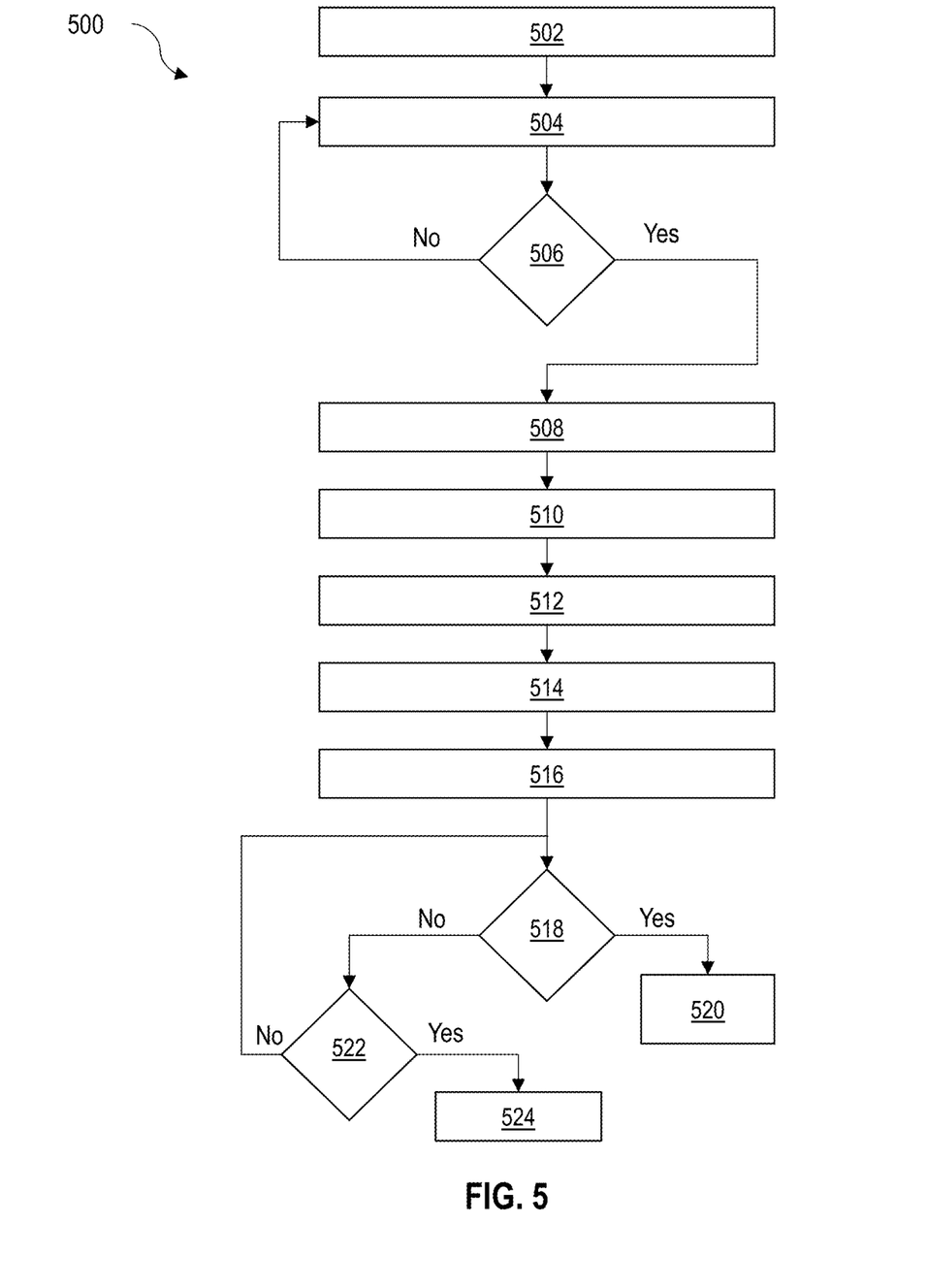
FIG. 5 is a flow chart representation of an example of a method of implementing a lane change using an embodiment of a lane change management system.

Referring to FIG. 5, a flow chart representation of an example of a method 500 of implementing a lane change using an embodiment of a lane change management system 110 is shown. The method 500 may be performed by hardware circuitry, firmware, software, and/or combinations thereof. At 502, the lane change management system 110 of an ego autonomous vehicle $100_{EV}$ receives a plurality of closed lane segment files from a lane change data aggregation system 152 at an edge computing system 150 and stores the received closed lane segment files in a local closed lane segment database 306. At 504, the lane change management system 110 determines a vehicle location of the ego autonomous vehicle $100_{EV}$ and generates a time stamp for association with the vehicle location.

At 506, the lane change management system 110 determines whether the local closed lane segment database 306 includes a closed lane segment file including a lane closure start point $C_1$ of a closed lane segment 400 within a pre-defined distance of the vehicle location of the ego autonomous vehicle $100_{EV}$. If the lane change management system 110 determines that the local closed lane segment database 306 does not include a closed lane segment file including a lane closure start point $C_1$ of a closed lane segment 400 within a pre-defined distance of the vehicle location of the ego autonomous vehicle $100_{EV}$, the method 500 returns to 504. If the lane change management system 110 determines that the local closed lane segment database 306 does include a closed lane segment file including a lane closure start point $C_1$ of a closed lane segment 400 within a pre-defined distance of the vehicle location of the ego autonomous vehicle $100_{EV}$, the lane change management system 110 retrieves the closed lane segment file at 508.

At 510, the lane change management system 110 selects the lane change histogram 408 from the set of lane change histograms in the retrieved closed lane segment file associated with a pre-defined time interval that includes the time defined in the time stamp associated with the vehicle location the ego autonomous vehicle $100_{EV}$. At 512, the lane change management system 110 defines a lane change inform point $P_i$, a lane change control point $P_c$, and a lane change alert point $P_a$ associated with the closed lane segment 400 based on the selected lane change histogram 408.

At 514, the lane change management system 110 issues a command to a user interface of the ego autonomous vehicle $100_{EV}$ to display a lane change indication at the user interface at the lane change inform point $P_i$. The lane change indication operates to inform the occupants of the ego autonomous vehicle $100_{EV}$ that a lane change is expected to occur from the first lane 402 to the second lane 406 of the road 404 in response to an approaching closed lane segment 400.

At 516, the lane change management system 110 issues a command to an ADS of the ego autonomous vehicle $100_{EV}$ to implement actions to initiate a lane change from the first lane 402 to the second lane 404 at the lane change control point $P_c$. Examples of actions implemented by the ADS include, but are not limited to, turn signal activation, adjacent vehicle sensing and motion control to execute the lane change. The lane change management system 110 issues a command to a user interface of the ego autonomous vehicle $100_{EV}$ to display a lane change control point indication at the user interface at the lane change control point $P_c$. The lane change control point indication operates to inform the occupants of the ego autonomous vehicle $100_{EV}$ that a lane change has been initiated from the first lane 402 to the second lane 406 of the road 404 in response to the closed lane segment 400 at the lane change control point $P_c$.

At 518, the lane change management system 110 determines whether the lane change was successful. If the lane change management system 110 determines that the lane change was successful, the lane change management system 110 issues a command to a user interface of the ego autonomous vehicle $100_{EV}$ to display a lane change completion indication at the user interface at 520.

If the lane change management system 110 determines that the lane change was not successful, the lane change management system 110 determines whether the ego autonomous vehicle $100_{EV}$ is at the lane change alert point $P_a$ at 522. If the lane change management system 110 determines that the ego autonomous vehicle $100_{EV}$ is not at the lane change alert point $P_a$, the method returns to 518.

If the lane change management system 110 determines that the ego autonomous vehicle $100_{EV}$ is at the lane change alert point $P_a$, the lane change management system 110 issues a command to a user interface of the ego autonomous vehicle $100_{EV}$ to display a lane change takeover request at the user interface at 524. The lane change takeover request is a request to a user of the ego autonomous vehicle $100_{EV}$ to assume manual control of the ego autonomous vehicle $100_{EV}$ to manually initiate the lane change from the first lane 402 to the second lane 404 in response to the closed lane segment 400. If the ego autonomous vehicle $100_{EV}$ passes the lane change alert point $P_a$ without a user of the ego autonomous vehicle $100_{EV}$ assuming manual control of the ego autonomous vehicle $100_{EV}$, the ego autonomous vehicle $100_{EV}$ may actuate the motion control system to bring the vehicle to a stop.

Figure 6:
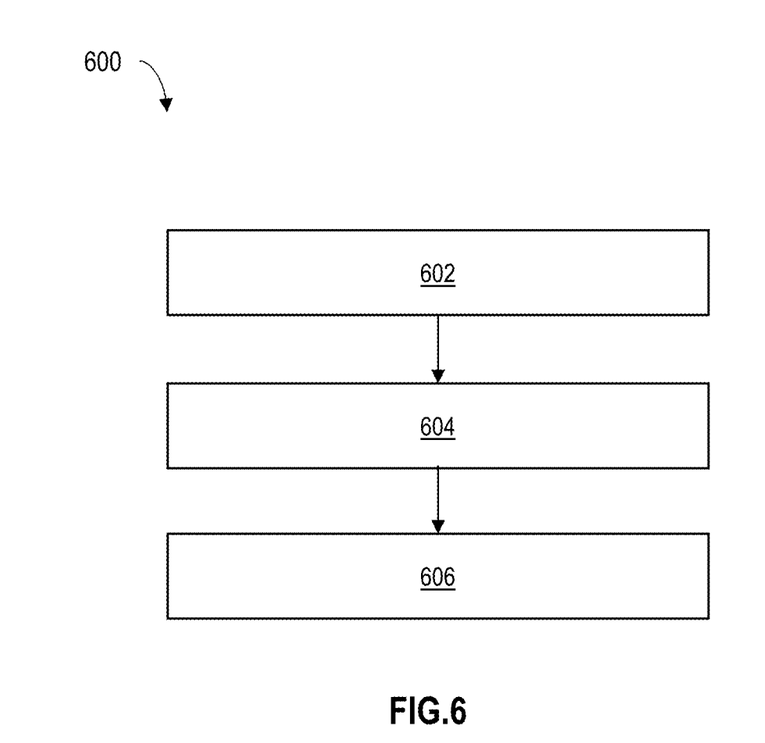
FIG. 6 is a flow chart representation of an example of a method of implementing a lane change using an embodiment of the lane change management system.

Referring to FIG. 6, a flow chart representation of an example of a method 600 of implementing a lane change using an embodiment of the lane change management system 110 is shown. The method 600 may be performed by hardware circuitry, firmware, software, and/or combinations thereof.

At 602, a first closed lane segment file including a first lane change histogram 408 and a lane closure start point $C_1$ associated with a closed lane segment 400 of a first lane 402 of a road 404 is received from a lane change data aggregation system 152 at a lane change management system 110. The first lane change histogram 408 includes a distribution of a plurality of lane change points received from vehicles that previously engaged in a lane change from the first lane 402 to a second lane 406 of the road 404 in response to the closed lane segment 400. At 604, a lane change control point $P_C$ is determined based on the first lane change histogram 408 at the lane change management system 110. At 606, a command is issued from the lane change management system 110 to an ADS of the autonomous vehicle 100 to initiate a lane change from the first lane 402 to the second lane 406 at the lane change control point $P_C$.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It is to be understood that various changes can be made in the function and arrangement of elements without departing from the scope of the disclosure as set forth in the appended claims and the legal equivalents thereof

What is claimed is:

1. A lane change management system for implementing a lane change of an autonomous vehicle in response to a closed lane segment comprising:
  a processor; and
  a memory, the memory comprising instructions that upon execution by the processor, cause the processor to:
   receive a first closed lane segment file including a first lane change histogram and a lane closure start point and a lane closure end point associated with a closed lane segment of a first lane of a road from a lane change data aggregation system, the first lane change histogram comprising a distribution of a plurality of lane change points received from vehicles that previously engaged in a lane change from the first lane to a second lane of the road in response to the closed lane segment, wherein the plurality of lane change points are defined as locations of a start of the lane change of the vehicles relative to the lane closure start point and the histogram includes a frequency of the plurality of lane change points;
   determine a lane change control point based on the first lane change histogram; and
   issue a command to an ADS of the autonomous vehicle to initiate a lane change from the first lane to the second lane at the lane change control point.

2. The system of claim 1, wherein the memory further comprises instructions that upon execution by the processor, cause the processor to identify the lane change control point as a mean lane change point of the distribution of the plurality of lane change points in the first lane change histogram.

3. The system of claim 1, wherein the memory further comprises instructions that upon execution by the processor, cause the processor to identify the lane change control point as a median lane change point of the distribution of the plurality of lane change points in the first lane change histogram.

4. The system of claim 1, wherein the memory further comprises instructions that upon execution by the processor, cause the processor to:
  receive a plurality of closed lane segment files associated with a plurality of closed lane segments from the lane change data aggregation system, each of the plurality of closed lane segment files including at least one lane change histogram and a lane closure start point and a lane closure end point;
  store the plurality of closed lane segment files at a local closed lane segment database;
  receive a vehicle location of the autonomous vehicle from a vehicle sensor system;
  determine whether the first lane closure start point associated with one of the plurality of closed lane segments is within a pre-defined distance of the vehicle location; and
  retrieve the first closed lane segment file based on the determination.

5. The system of claim 1, wherein the memory further comprises instructions that upon execution by the processor, cause the processor to:
  receive the first closed lane segment file including a plurality of lane change histograms associated with the closed lane segment from the lane change data aggregation system, each of the plurality of lane change histograms being associated with a different pre-defined time interval; and identify the first lane change histogram from the plurality of lane change histograms, the first lane change histogram being associated with a first pre-defined time interval including a current time.

6. The system of claim 1, wherein the memory further comprises instructions that upon execution by the processor, cause the processor to:

define a virtual road segment of the first lane extending from the lane closure start point to a virtual lane segment end point, the virtual lane segment end point being disposed at a pre-defined distance ahead of the lane closure start point;

generate a lane change inform point at a pre-defined preview distance ahead of the virtual lane segment; and issue a command to a user interface of the autonomous vehicle to display a lane change indication at the lane change inform point.

7. The system of claim 1, wherein the memory further comprises instructions that upon execution by the processor, cause the processor to:

determine a lane change alert point on the first lane based on a time to collision associated with the lane closure start point;

determine whether the lane change from the first lane to the second lane has been initiated prior to arrival of the autonomous vehicle at the lane change alert point; and issue a command to a user interface of the autonomous vehicle to display a lane change takeover request based on the determination.

8. The system of claim 1, wherein the memory further comprises instructions that upon execution by the processor, cause the processor to:

receive a user preference defining a gap setting between the autonomous vehicle and a vehicle disposed in front of the autonomous vehicle; and adjust the lane change control point in accordance with the user preference.

9. The system of claim 1, wherein the memory further comprises instructions that upon execution by the processor, cause the processor to:

detect whether the autonomous vehicle has completed the lane change from the first lane to the second lane; and issue a command to a user interface of the autonomous vehicle to display a lane change complete indication based upon the determination.

10. A computer readable medium comprising instructions stored thereon for implementing a lane change of an autonomous vehicle in response to a closed lane segment, that upon execution by a processor, cause the processor to:

receive a first closed lane segment file including a first lane change histogram, a lane closure start point and a lane closure end point associated with a closed lane segment of a first lane of a road from a lane change data aggregation system, the first lane change histogram comprising a distribution of a plurality of lane change points received from vehicles that previously engaged in a lane change from the first lane to a second lane of the road in response to the closed lane segment, wherein the plurality of lane change points are defined as locations of a start of the lane change of the vehicles relative to the lane closure start point, and the histogram includes a frequency of the plurality of lane change points;

determine a lane change control point based on the first lane change histogram; and issue a command to an ADS of the autonomous vehicle to initiate a lane change from the first lane to the second lane at the lane change control point.

11. The computer readable medium of claim 10, further comprising instructions to cause the processor to identify the lane change control point as a mean lane change point of the distribution of the plurality of lane change points in the first lane change histogram.

12. The computer readable medium of claim 10, further comprising instructions to cause the processor to identify the lane change control point as a median lane change point of the distribution of the plurality of lane change points in the first lane change histogram.

13. The computer readable medium of claim 10, further comprising instructions to cause the processor to:

receive a plurality of closed lane segment files associated with a plurality of closed lane segments from the lane change data aggregation system, each of the plurality of closed lane segment files including at least one lane change histogram and a lane closure start point and a lane closure end point;

store the plurality of closed lane segment files at a local closed lane segment database;

receive a vehicle location of the autonomous vehicle from a vehicle sensor system;

determine whether the first lane closure start point associated with one of the plurality of closed lane segments is within a pre-defined distance of the vehicle location; and retrieve the first closed lane segment file based on the determination.

14. The computer readable medium of claim 10, further comprising instructions to cause the processor to:

receive the first closed lane segment file including a plurality of lane change histograms associated with the closed lane segment from the lane change data aggregation system, each of the plurality of lane change histograms being associated with a different pre-defined time interval; and identify the first lane change histogram from the plurality of lane change histograms, the first lane change histogram being associated with a first pre-defined time interval including a current time.

15. The computer readable medium of claim 10, further comprising instructions to cause the processor to:

define a virtual road segment of the first lane extending from the lane closure start point to a virtual lane segment end point, the virtual lane segment end point being disposed at a pre-defined distance ahead of the lane closure start point;

generate a lane change inform point at a pre-defined preview distance ahead of the virtual lane segment; and issue a command to a user interface of the autonomous vehicle to display a lane change indication at the lane change inform point.

16. The computer readable medium of claim 10, further comprising instructions to cause the processor to:

determine a lane change alert point on the first lane based on a time to collision associated with the lane closure start point;

determine whether the lane change from the first lane to the second lane has been initiated prior to arrival of the autonomous vehicle at the lane change alert point; and issue a command to a user interface of the autonomous vehicle to display a lane change takeover request based on the determination.

17. A method of implementing a lane change of an autonomous vehicle in response to a closed lane segment comprising:
receiving a first closed lane segment file including a first lane change histogram and a lane closure start point and a lane closure end point associated with a closed lane segment of a first lane of a road from a lane change data aggregation system at a lane change management system, the first lane change histogram comprising a distribution of a plurality of lane change points received from vehicles that previously engaged in a lane change from the first lane to a second lane of the road in response to the closed lane segment, wherein the plurality of lane change points are defined as locations of a start of the lane change of the vehicles relative to the lane closure start point, and the histogram includes a frequency of the plurality of lane change points;
determining a lane change control point based on the first lane change histogram at the lane change management system; and
issuing a command from the lane change management system to an ADS of the autonomous vehicle to initiate a lane change from the first lane to the second lane at the lane change control point.

18. The method of claim 17, further comprising:
receiving the first closed lane segment file including a plurality of lane change histograms associated with the closed lane segment from the lane change data aggregation system at the lane change management system, each of the plurality of lane change histograms being associated with a different pre-defined time interval; and
identifying the first lane change histogram from the plurality of lane change histograms, the first lane change histogram being associated with a first pre-defined time interval including a current time at the lane change management system.

19. The method of claim 17, further comprising:
defining a virtual road segment of the first lane extending from the lane closure start point to a virtual lane segment end point at the lane change management system, the virtual lane segment end point being disposed at a pre-defined distance ahead of the lane closure start point;
generating a lane change inform point at a pre-defined preview distance ahead of the virtual lane segment at the lane change management system; and
issuing a command from the lane change management system to a user interface of the autonomous vehicle to display a lane change indication at the lane change inform point.

20. The method of claim 17, further comprising:
determining a lane change alert point on the first lane based on a time to collision associated with the lane closure start point at the lane change management system;
determining whether the lane change from the first lane to the second lane has been initiated prior to arrival of the autonomous vehicle at the lane change alert point at the lane change management system; and
issuing a command from the lane change management system to a user interface of the autonomous vehicle to display a lane change takeover request based on the determination.

* * * * *